Nov. 22, 1960  R. F. COOK ET AL  2,961,554
CERAMIC BODIES BASED ON BARIUM TITANATE
Filed April 1, 1958
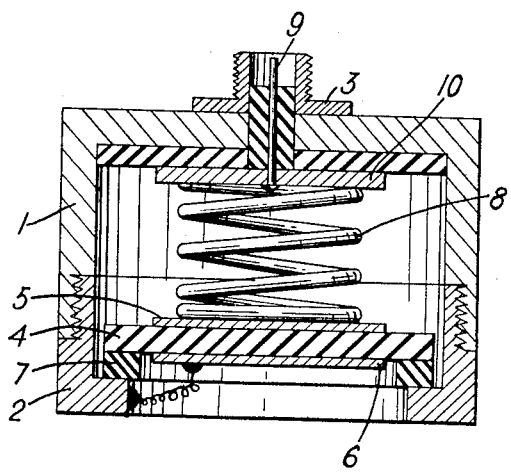
Inventor
Donald Frederick Cook & Roger West
By
Hooper Leonard & Bell
Attorneys.

United States Patent Office 2,961,554
Patented Nov. 22, 1960

2,961,554

CERAMIC BODIES BASED ON BARIUM TITANATE

Ronald Frederick Cook, London, and Roger West, Richmond, England, assignors to British Dielectric Research Limited, London, England, a British company Filed Apr. 1, 1958, Ser. No. 725,655

Claims priority, application Great Britain Apr. 2, 1957

3 Claims. (Cl. 310—8)

This invention relates to barium titanate ceramics which are suitable for use in the manufacture of electromechanical transducers. It is well known that additives to such ceramics change their critical temperatures or "transition points" and that it is important that in ceramic bodies for use in electro-mechanical transducers (hereinafter referred to as piezo-electric bodies) the second transition point should be lowered, as compared with pure barium titanate. Calcium titanate has been recognised to be a suitable additive for lowering the second transition point but its use alone with barium titanate does not result in a commercially satisfactory piezo-electric body and lead titanate has been proposed as a second additive, for use in conjunction with calcium titanate.

The use of lead titanate in this way introduces manufacturing difficulties, since it is volatile and since the bodies containing it are very susceptible to grain growth, if not cooled rapidly after firing.

The present invention is based on our discovery that a satisfactory piezo-electric ceramic body, based on barium titanate, can be made by standard ceramic techniques if the lead titanate is omitted and replaced by a small quantity of cobalt oxide.

In accordance with the invention, a piezo-electric ceramic body is made by firing together ingredients which yield barium titanate containing from 0.5% to 9% by weight of calcium titanate and a small quantity, not exceeding 1% by weight, of cobalt oxide, based on the total weight of barium and calcium titanates.

A ceramic body in accordance with the invention is one which on analysis yields BaO, CaO, $TiO_2$ and CoO in quantities such that the $TiO_2$ content is substantially stoichiometric with the total content of BaO and CaO; the relation between the BaO and CaO contents is such as to yield 0.5% to 9% by weight of calcium titanate, based on the total weight of barium and calcium titanates, and the CoO content is up to 1% of the total weight of BaO, CaO and $TiO_2$.

The preferred range of the CoO content is 0.25%–0.75%, 0.5% being the preferred content.

One preferred composition is one which yields on analysis:

| | Parts by weight |
|---|---|
| BaO | 62.50 |
| CaO | 2.06 |
| $TiO_2$ | 35.44 |
| CoO | 0.50 |

The ceramic bodies in accordance with the invention can be made by any standard ceramic technique but we prefer to mix together barium oxide, calcium oxide, titanium dioxide and cobalt oxide (or materials which yield these oxides on firing), fire the mixture, e.g. at 1100° C., grind the product, shape the granular product, with the aid of a suitable volatile binder (if necessary) and finally to sinter the shaped body. We prefer to use pure titania, such as is obtained from redistilled titanium chloride.

The calcium titanate content is chosen in accordance with the desired value of the second transition temperature.

The cobalt oxide addition does not substantially affect the lower transition point, but causes a slight lowering of the upper transition point. Its most marked effects are on the coupling factor and on the density of the ceramic but it also brings about some increase in the mechanical Q value. In particular the maximum density can be attained at lower firing temperatures.

While barium titanate bodies containing only calcium titanate and cobalt oxide have been described above, the use of small quantities of other additives is not excluded and is within the scope of the present invention.

The manufacture of seven examples (A–G) of piezo-electric compositions in accordance with the invention will hereinafter be described, our preferred composition being that referred to as "A."

The following ingredients were used in the manufacture of the compositions:

| Ingredient | Supplier | Grade |
|---|---|---|
| Barium carbonate | Laporte | Pure. |
| Calcium carbonate | Hopkins & Williams | Light precipitated. |
| Titanium dioxide | Laporte | Pure. |
| Do | British Titanium Products Ltd. | Kronos E. Anatase. |
| Cobalt carbonate | British Drug Houses | Laboratory reagent. |
| Manganese dioxide | do | Precipitated. |

The pure grade of titania was only used in Example A. It is a form obtained from redistilled titanium chloride. The Kronos E. Anatase grade used in all other examples is a typical commercial material in which impurities, which give rise to colour, such as iron and vanadium, are kept to very low limits, but in which silica, phosphate (expressed as phosphorus pentoxide) and water soluble salts (alkali sulphates) are each present to the extent of 0.3% to 0.5%. The pure grade of titania contains negligible amounts of soluble salts and phosphate; silica is substantially lower at circa 0.1% and the only other impurity of any importance is alumina, 0.08%. The term "pure titania" as used herein means titania with a purity of this order.

The method of manufacturing the bodies followed normal ceramic technique. The ingredients were first ball milled using 0.1% gum arabic solution as dispersing agent and then calcined at 1100° C. for 3 hours. The calcined materials were again milled and during this milling 2.5% of polyvinyl acetate, added in the form of an emulsion, sold as "Vinamul," was incorporated as a binder. Discs were pressed in 0.875" diameter moulds at 3 tons per square inch and a number of discs of each composition fired at various temperatures ranging from 1180° C. to 1400° C. The density of all of the discs was measured and discs of each composition having the highest density were selected. These discs were silvered, without margins, on both plane surfaces using a standard silver paint of the kind which deposits an adherent layer of silver on firing.

The physical and electrical properties of the selected discs are set out in the following table. In this table each of the percentage contents is calculated on the total weight of barium titanate and calcium titanate, $f_r$ is the resonant frequency and the optimum firing temperature is the temperature at which the maximum density was obtained for each composition.

| Example | A | B | C | D | E | F | G |
|---|---|---|---|---|---|---|---|
| CaTiO₃ content, percent | 5 | 5 | 5 | 5 | 2.5 | 6 | 7 |
| CoO content, percent | 0.5 | 0.5 | 1.0 | 0.5 | 0.5 | 0.5 | 0.5 |
| MnO₂ content, percent | | | | 0.5 | | | |
| Density, gm./cc | 5.77 | 5.76 | 5.74 | 5.73 | 5.78 | 5.72 | 5.69 |
| Optimum firing temperature, °C | 1,305 | 1,220 | 1,200 | 1,250 | 1,325 / 1,410 | 1,275 | 1,315 |
| Permittivity at 20° C | 1,350 | 1,250 | 1,265 | 1,275 | 1,000 / 1,440 | 1,125 | 1,400 |
| tan d at 1 kc./s | 0.014 | 0.012 | 0.017 | 0.020 | 0.013 | 0.013 | 0.007 |
| Upper transition, °C | 90 | 100 | 85 | 95 | 100 | 100 | 115 |
| Lower transition, °C | −40 | −30 | below −60 | below −50 | −10 | below −60 | below −60 |
| df/fr, percent | 4.8 | 3.7 | 2.2 | 2.4 | 4.4 | 3.6 | 2.5 |
| Coupling factor, percent | 32.9 | 29.1 | 23.1 | 24.0 | 31.4 | 28.9 | 24.4 |
| Mechanical Q | 837 | 719 | 724 | 775 | 910 | 640 | 800 |

The mechanical Q was calculated from the formula $$Q = \frac{10^{12}}{4 df C R_{min}}$$

in which $df$ is the difference in frequency between resonance and anti-resonance for the radial contour extensional mode. C is the capacitance of the disc in $pF$ and $R_{min}$ the impedance of the disc in ohms at resonance.

It will be seen from a comparison of Examples A and B that when pure titania is used, a higher coupling factor and higher mechanical Q is obtained.

By a comparison of compositions B and C it will be seen that with increasing quantities of cobalt oxide both the coupling factor and the upper transition temperature are reduced and that compositions containing more than 1% of cobalt oxide would have an upper transition temperature which is too low for most practical purposes.

From compositions E, F and G it will be seen that increasing quantities of calcium titanate raise the upper transition temperature and reduce the lower transition temperature but that at the same time the coupling factor is reduced. From this trend it is apparent that compositions containing very small quantities of calcium titanate, i.e. less than 0.5% have a lower transition temperature which is too high for practical purposes.

Composition D which contains both cobalt oxide and manganese dioxide has a high mechanical Q but it has a low coupling factor and we believe that the coupling factor may be temperature sensitive. Composition E had two optimum firing temperatures, 1325° C. and 1410° C., but the samples fired at these two temperatures differed only in permittivity.

By selecting a calcium titanate content between 0.5% and 9%, using a given quantity of cobalt oxide (preferably 0.5%), compositions having characteristics in accordance with a given specification can be obtained.

An example of an electromechanical transducer in accordance with the invention will be described with reference to the accompanying drawing which shows the transducer in cross-section. The cylindrical metallic body of the transducer is in two parts 1 and 2 the upper part carrying a coaxial socket 3. The piezo body 4 having opposed electrodes 5 and 6 applied by vacuum deposition is mounted between a rubber ring 7 and a spring 8. The spring 8 is electrically connected to the inner terminal 9 of the coaxial socket through a metal plate 10 and the electrode 6 is electrically connected to the outer terminal of the socket 3 through the metallic casing of the transducer.

What we claim as our invention is:

1. A piezo-electric transducer having a mechanical Q of at least 500 and a coupling factor of at least 28% comprising a piezo-electric body, opposed electrodes on said body and means for transmitting mechanical vibrations coupled to said body, said body being a ceramic body which on analysis yields BaO, CaO, TiO₂ and CoO in quantities such that the TiO₂ content is substantially stoichiometric with the total content of BaO and CaO, the relation between the BaO and CaO contents being such as to yield 0.5% to 9% by weight of calcium titanate, based on the total weight of BaO, CaO and TiO₂, and CoO content is an amount up to 1% of the total weight of BaO, CaO, and TiO₂, sufficient to give the required piezo-electric properties to the ceramic.

2. A piezo-electric transducer having a mechanical Q of at least 500 and a coupling factor of at least 28% comprising a piezo-electric body, opposed electrodes on said body and means for transmitting mechanical vibrations coupled to said body, said body being a ceramic body which on analysis yields BaO, CaO, TiO₂ and CoO in quantities such that the TiO₂ content is substantially stoichiometric with the total content of BaO and CaO, the relation between the BaO and CaO contents being such as to yield 0.5% to 9% by weight of calcium titanate, based on the total weight of BaO, CaO and TiO₂, and the CoO content is 0.25% to 0.75% of the total weight of BaO, CaO and TiO₂.

3. A piezo-electric transducer having a mechanical Q of at least 500 and a coupling factor of at least 28% comprising a piezo-electric body, opposed electrodes on said body and means for transmitting mechanical vibrations coupled to said body, said body being a ceramic body which on analysis yields BaO, CaO, TiO₂ and CoO in quantities such that the TiO₂ content is substantially stoichiometric with the total content of BaO and CaO, the relation between the BaO and CaO contents being such as to yield 5% by weight of calcium titanate, based on the total weight of BaO, CaO and TiO₂, and the CoO content is 0.5% of the total weight of BaO, CaO and TiO₂.

References Cited in the file of this patent
UNITED STATES PATENTS

| | | |
|---|---|---|
| 2,576,379 | Woodcock et al. | Nov. 27, 1951 |
| 2,758,911 | Lynd | Aug. 14, 1956 |